United States Patent
Shann et al.

(10) Patent No.: US 8,464,235 B2
(45) Date of Patent: Jun. 11, 2013

(54) ADAPTIVE PRODUCTION OF ASSEMBLER

(75) Inventors: Richard Shann, Bristol (GB); Marian MacCormack, Edinburgh (GB)

(73) Assignee: STMicroelectronics Ltd., Almondsbury, Bristol (GB)

( * ) Notice: Subject to any disclaimer, the term of this patent is extended or adjusted under 35 U.S.C. 154(b) by 554 days.

(21) Appl. No.: 12/686,987

(22) Filed: Jan. 13, 2010

(65) Prior Publication Data

US 2010/0115498 A1 May 6, 2010

Related U.S. Application Data

(63) Continuation of application No. 09/714,804, filed on Nov. 16, 2000, now abandoned.

(30) Foreign Application Priority Data

Nov. 30, 1999 (GB) .................................. 9928341.8

(51) Int. Cl.
*G06F 9/44* (2006.01)
*G06F 9/45* (2006.01)

(52) U.S. Cl.
USPC .......................... 717/162; 717/140; 717/147

(58) Field of Classification Search
None
See application file for complete search history.

(56) References Cited

U.S. PATENT DOCUMENTS

| | | | | |
|---|---|---|---|---|
| 4,667,290 A | * | 5/1987 | Goss et al. | 717/147 |
| 5,355,491 A | * | 10/1994 | Lawlor et al. | 717/147 |
| 5,854,929 A | * | 12/1998 | Van Praet et al. | 717/156 |
| 5,918,035 A | * | 6/1999 | Van Praet et al. | 703/22 |
| 6,292,938 B1 | * | 9/2001 | Sarkar et al. | 717/138 |
| 6,385,757 B1 | * | 5/2002 | Gupta et al. | 716/102 |
| 6,457,173 B1 | * | 9/2002 | Gupta et al. | 717/149 |
| 6,463,582 B1 | * | 10/2002 | Lethin et al. | 717/158 |
| 6,467,082 B1 | * | 10/2002 | D'Arcy et al. | 717/127 |
| 6,477,683 B1 | * | 11/2002 | Killian et al. | 716/106 |
| 6,564,274 B1 | * | 5/2003 | Heath et al. | 710/105 |
| 6,581,187 B2 | * | 6/2003 | Gupta et al. | 716/103 |
| 6,651,222 B2 | * | 11/2003 | Gupta et al. | 716/102 |
| 6,704,928 B1 | * | 3/2004 | Shann | 717/162 |
| 6,760,888 B2 | * | 7/2004 | Killian et al. | 716/102 |
| 6,772,106 B1 | * | 8/2004 | Mahlke et al. | 717/128 |
| 6,901,584 B2 | * | 5/2005 | Shann | 717/140 |
| 7,020,854 B2 | * | 3/2006 | Killian et al. | 716/102 |
| 7,127,711 B2 | * | 10/2006 | Shann et al. | 717/162 |

(Continued)

FOREIGN PATENT DOCUMENTS

| | | |
|---|---|---|
| DE | 39 21 628 | 1/1991 |
| GB | 2127188 A | 4/1984 |

OTHER PUBLICATIONS

Reshadi et al., "A Retargetable Framework for Instruction-Set Architecture Simulation", 2005 ACM, pp. 1-20; <http://dl.acm.org/citation.cfm?id=1151074.1151083&coll=DL&dl=GUIDE&CFID=289988230&CFTOKEN=49801346>.*

(Continued)

*Primary Examiner* — Thuy Dao
*Assistant Examiner* — Ben C Wang
(74) *Attorney, Agent, or Firm* — Wolf, Greenfield & Sacks, P.C.

(57) ABSTRACT

A system for providing an assembler for a microprocessor has a file which contains data describing the instruction set of the microprocessor. A translation device for translating into machine language accesses the instruction set descriptors to constrain the machine code output of the assembler to conform to the architecture of the instruction set.

27 Claims, 2 Drawing Sheets

U.S. PATENT DOCUMENTS

| | | | | |
|---|---|---|---|---|
| 7,200,843 | B2* | 4/2007 | Shann | 717/162 |
| 7,237,233 | B2* | 6/2007 | Knueven et al. | 717/140 |
| 7,299,462 | B2* | 11/2007 | Shann et al. | 717/162 |
| 7,418,580 | B1* | 8/2008 | Campbell et al. | 712/227 |
| 7,600,096 | B2* | 10/2009 | Parthasarathy et al. | 712/34 |
| 8,006,204 | B2* | 8/2011 | Killian et al. | 716/100 |
| 8,006,225 | B1* | 8/2011 | Braun et al. | 717/123 |
| 2002/0042909 | A1* | 4/2002 | Van Gageldonk et al. | 717/149 |
| 2002/0104078 | A1* | 8/2002 | Shann et al. | 717/162 |
| 2002/0124242 | A1* | 9/2002 | McGoogan et al. | 717/165 |
| 2002/0138824 | A1* | 9/2002 | Shann | 717/140 |
| 2002/0147969 | A1* | 10/2002 | Lethin et al. | 717/138 |
| 2002/0170041 | A1* | 11/2002 | Shann | 717/141 |
| 2003/0208723 | A1* | 11/2003 | Killian et al. | 716/1 |
| 2004/0098563 | A1* | 5/2004 | Parthasarathy et al. | 712/34 |
| 2004/0250231 | A1* | 12/2004 | Killian et al. | 716/18 |
| 2005/0071808 | A1* | 3/2005 | Luculli | 717/106 |
| 2005/0216701 | A1* | 9/2005 | Taylor | 712/34 |
| 2005/0289485 | A1* | 12/2005 | Willis | 716/1 |
| 2006/0259878 | A1* | 11/2006 | Killian et al. | 716/1 |
| 2007/0277130 | A1* | 11/2007 | Lavelle | 716/4 |
| 2008/0244471 | A1* | 10/2008 | Killian et al. | 716/1 |
| 2008/0244506 | A1* | 10/2008 | Killian et al. | 717/100 |
| 2012/0017196 | A1* | 1/2012 | Ng et al. | 717/140 |

OTHER PUBLICATIONS

Hadjiyiannis et al., "An Instruction Set Description Language for Retargetability and Architecture Exploration", 2000 Kluwer Academic Publishers, pp. 39-69; <http://link.springer.com/article/10.1023%2FA%3A1008937425064?LI=true#page-1>.*

Luculli et al., "An ISA-Retargetable Framework for Embedded Software Analysis", 2003 IEEE, Engineering of Computer-Based Systems, 2003. Proceedings. 10th IEEE International Conference and Workshop, pp. 1-8; <http://ieeexplore.ieee.org/stamp/stamp.jsp?tp=&arnumber=1194798>.*

Standard Search Report from United Kingdom application No. 9928341, filed Nov. 30, 1999.

Kunimine Y; *The XASS-V Cross Assembler Handles any Custom MPU or Word Length*, JEE vol. 23.No. 237. Sep. 1986, pp. 95-98, XP002147997.

Edmonds A.N., *Microcoding and Bit-Slice Techniques*, Electronics & Wireless World, vol. 94, No. 1625, Mar. 1008, pp. 266-268, XP000001944.

Hadjiyiannis G, et al., *ISDL:An Instruction Set Description Language for Retargetability*, Proc. of the 34<sup>th</sup> Annual Conf. on Design Automation DAC '97, [Online] vol. Conf. 34, Jun. 9-13, 1997, pp. 299-302, XP000731853.

British Search Report from British patent application No. 9928341.8, filed Nov. 30, 1999.

*Automatic Translation of Assembly Language Software*R.A. Lawler Inspec abstract Accession No. 3029114 & "IEEE 1987 National Aerospace and Electronics Conference (NAECON)" published 1987, IEEE, pp. 728-731, vol. 3.

Hadjiyiannis G, et al., ISDL: An Instruction Set Description Language for Retargetability, Proc. of the 34<sup>th</sup> Annual Conf. on Design Automation DAC '97, [Online] vol. Conf. 34, Jun. 9-13, 1997, pp. 299-302.

Edmonds A.AN., Microcoding and Bit-Slice Techniques, Electronics & Wireless World, vol. 94, No. 1625, Mar. 1988, pp. 266-268.

Kunimine Y; The XASS-V Cross Assembler Handles any Custom MPU or Word Length, JEE vol. 23. No. 237. Sep. 1986, pp. 95-98.

* cited by examiner

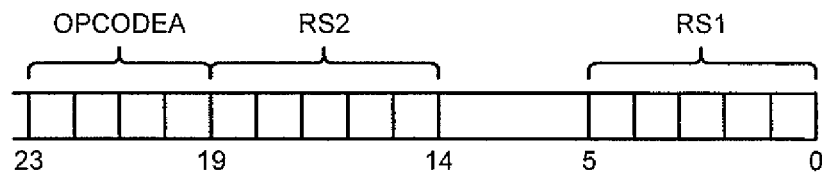
FIG. 3
| | | 2A | 1A | | |
|---|---|---|---|---|---|
| | | 14 | 0 | | |
| | | 5 | 5 | | |
| | | 19 | 5 | | |
FIG. 4
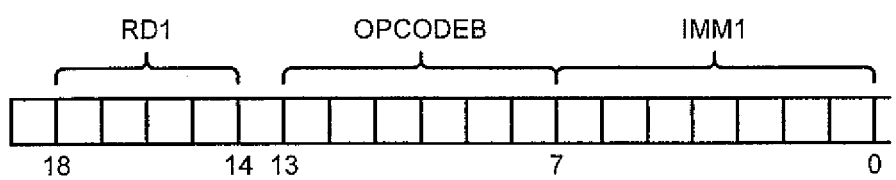
FIG. 5
| | | DB | IB | | |
|---|---|---|---|---|---|
| | | 14 | 0 | | |
| | | 4 | 7 | | |
| | | 18 | 7 | | |
FIG. 6

ADAPTIVE PRODUCTION OF ASSEMBLER

CROSS REFERENCE TO RELATED APPLICATIONS

This application is a continuation of U.S. application Ser. No. 09/714,804, entitled "ADAPTIVE PRODUCTION OF ASSEMBLER" filed on Nov. 16, 2000, which is herein incorporated by reference in its entirety.

This application claims the priority benefit of United Kingdom patent application number 9928341.8, filed on Nov. 30, 1999, entitled "ASSEMBLER SET," which is hereby incorporated by reference to the maximum extent allowable by law.

FIELD OF THE INVENTION

The present invention relates to a system for generating an assembler for a target microprocessor, a method of assembling a machine language program, an assembler for a microprocessor and to a method of preparing a program for execution on a microprocessor.

BACKGROUND OF THE INVENTION

During the preparation of a binary machine language program for execution on a microprocessor a number of operations are effected. Such operations include translation of a representation of the program in a source language into the binary machine language, binding symbols to addresses, and debugging the program. The process of translation may be accomplished by a compiler which receives as its inputs a high level language representation of the program, or an assembler which receives as its inputs an assembly language representation of the program.

A problem exists in the preparation of programs for microprocessors which are still in the process of development in that the architecture of the instruction set may alter during development of the microprocessor. Such changes may take the form of altering the size and location of instruction operands or the writing of new instructions.

Assemblers are typically programs which translate instructions comprising mnemonics and operands into binary representations and which translate the mnemonics and operands (including immediate data) into corresponding binary values, viz opcodes and encoded operands. Each instruction comprises a set of contiguous bit fields which fully characterize the instruction, where a bit field is a sequence of contiguous bits.

The assembler must ensure for example that the binary representation of operands are located in the correct bit field and this is typically achieved by hard coding of control information into the assembler program. Likewise, if encoding a particular operand involves a specified operation to encode it, for example, division by 2, this operation is typically hard coded into the assembler.

A problem which arises if the instruction set architecture is changed is that re-writing of the features hard coded into the assembler, amongst other things, will be necessary to account for the changes.

It is an object of the present invention to at least partially overcome the difficulties of the prior art.

It is an object of some embodiments of the invention to provide a system for generating an assembler which system takes into account updates in processor instruction architecture so that the resultant assembler complies with such updates.

SUMMARY OF THE INVENTION

According to one aspect of the invention there is provided a system for generating an assembler for a target microprocessor, the system comprising:—
  a descriptor file containing information descriptive of the instruction set of said target microprocessor and a translation device for translating assembly language into machine language as an output wherein the translation device comprises a fetching device for acquiring data from said descriptor file and a control device receiving said data from said fetching device and constraining the output of said translation device to conform to the architecture of said instruction set.

Preferably the descriptor file further comprises syntax information for each instruction, and the translation device translates each instruction on the basis of said syntax information.

Advantageously the system further comprises a data capture device having an input for accessing the instruction set of said target microprocessor and having an output, wherein said output comprises said descriptor file.

Preferably the system further comprises a linker, wherein the system has a data transfer device outputting selected data fetched from said descriptor file to said linker, whereby said linker uses said output data to modify the translated output of said system.

According to a second aspect, the invention comprises a method of assembling a machine language program for a target microprocessor comprising:—
  providing a descriptor file containing information descriptive of the instruction set of said target microprocessor;
  translating assembly language instructions into machine language wherein the translation step comprises
    acquiring data from said descriptor file; and
    constraining the machine language to conform to the architecture of said instruction set.

Advantageously said descriptor file further contains syntax information for each possible instruction of the instruction set, and said translating step comprises transliterating each assembly language instruction using said syntax information.

According to another aspect the invention provides a method of preparing a program executable on a target microprocessor comprising:
  capturing data from the instruction set of said target microprocessor thereby forming a descriptor file containing information descriptive of said instruction set;
  providing assembly language instructions for said is target microprocessor;
  translating each assembly language instruction into a corresponding machine language output; and
  using data from said descriptor file, constraining the machine language output to conform to the architecture of said instruction set.

According to a further aspect, the invention provides a method of preparing a program executable on a microprocessor, comprising:
  providing plural program modules, at least one of said modules having one or more instructions including external symbols, wherein external symbols have values which cannot be determined without reference to another program module;
  providing a descriptor file containing information descriptive of the instruction set of said target microprocessor;
  translating assembly language instructions into machine language wherein the translation step comprises
    acquiring data from said descriptor file;

constraining the machine language to conform to the architecture of said instruction set;

and further comprising binding external symbols to addresses using data selected from said descriptor file.

providing a descriptor file containing information descriptive of the instruction set of said target microprocessor;

translating assembly language instructions into machine language wherein the translation step comprises acquiring data from said descriptor file;

constraining the machine language to conform to the architecture of said instruction set;

and further comprising binding external symbols to addresses using data selected from said descriptor file.

BRIEF DESCRIPTION OF THE DRAWINGS

A preferred embodiment of the present invention will now be described, by way of example only, with reference to the accompanying drawings in which:—

FIG. 3 shows an exemplary instruction from the instruction set of FIG. 2.

FIG. 4 shows an entry in the description file shown in FIG. 2 corresponding to the instruction of FIG. 3.

FIG. 5 shows a second exemplary instruction of the instruction set of FIG. 2 and;

FIG. 6 shows a second entry in the description file of FIG. 2 corresponding to the instruction of FIG. 5.

DESCRIPTION OF THE PREFERRED EMBODIMENT

Every type of microprocessor has its own machine language which consists entirely of numbers and is very difficult to directly read or write. For this reason, it is normal when writing programs to write program modules in a high level language which is to a greater or lesser extent independent of the microprocessor. Then the program or program module is translated into machine language using a translation device known as a compiler.

In certain situations however it is necessary to write programs which are directly analogous to the machine language by writing detailed instructions in assembly language. Assembly language is, like machine language unique to each type of microprocessor but instead of being written in numbers, comprises mnemonic commands each corresponding to one of the microprocessor opcodes, together with operands. Operands can either be numbers or names used to make a symbolic reference to a number, typically the address of some named location in memory. After writing a program module in assembly language, the resultant text file is translated using an assembler into machine language.

Instructions consist of a number of bit fields each representing different information required to carry out an operation. Such fields include opcodes, operands and fields reserved for architecture use, the operands including register designators and immediate data. For any one microprocessor it is possible for instructions to have different formats appropriate to the operation being performed. Thus, one opcode may require two operands whereas another opcode may merely require a single operand.

Furthermore the size of a bit field available for the operand is likely to vary depending on the format which in turn depends upon the nature of the operand—for example a register identifier may be very much smaller than an instruction displacement.

Figure 1:
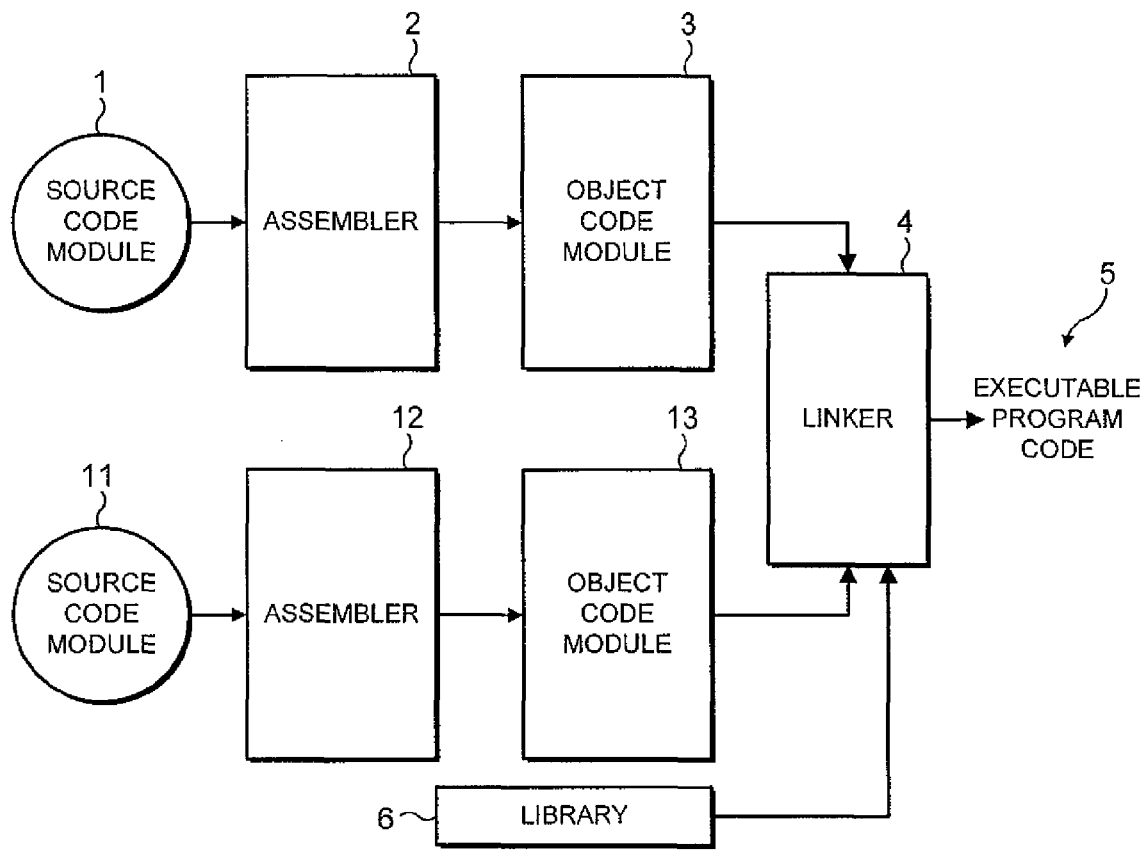
FIG. 1 shows a block diagram indicating the context of the present invention.

In FIG. 1 a first source code module 1 written in assembly language is input to assembler 2 to provide an object code module 3 which is in machine language and is directly analogous to the assembly language source code module. A second source code module 11, in assembly language is input to an assembler 12 to provide an object code module 13. It will of course be clear to those skilled in the art that more than two source code modules may be provided and that the same assembler could be used for each of a plurality of source code modules, the modules being assembled sequentially.

The source code modules provide an input to a linker 4 which may also receive an input from an object code library 6. The function of the linker includes binding those operands which are external symbols to addresses so that the object code modules cooperate together to form executable machine code. Some code modules from the library will be required to effect this, in the case that the symbolic references are to objects in the library. The linker thus performs the function of a link editor.

In the prior art, as mentioned above, the assembler which is typically a microprocessor program run on a host microprocessor, requires hard-coded information to enable it to transform an assembly language instruction into its machine code equivalent. For example, if the assembly language instruction has the effect of writing information to a register, the corresponding machine code instruction may only allocate a relatively small number of bits to the bit field which the microprocessor will use to determine which register, whereas if the instruction is to write to memory, a much larger bit field to permit the memory address to be encoded may be provided. Thus, in the prior art the programmer of the assembler might have to specify both the size and location of each bit field in each instruction, indexed by, for example, the opcode as hard-coded information into the assembler. Although this may be acceptable where the instruction set architecture is fixed and constant, it can cause severe difficulties when a microprocessor or series of microprocessors is under development.

Referring to FIGS. 2-6, an embodiment of the invention will be described in which hard-coding of the assembler is reduced, thus allowing an assembler to track changes in the instruction set more readily. In a preferred embodiment the assembler is able to automatically track changes in the instruction set as they occur.

Figure 2:
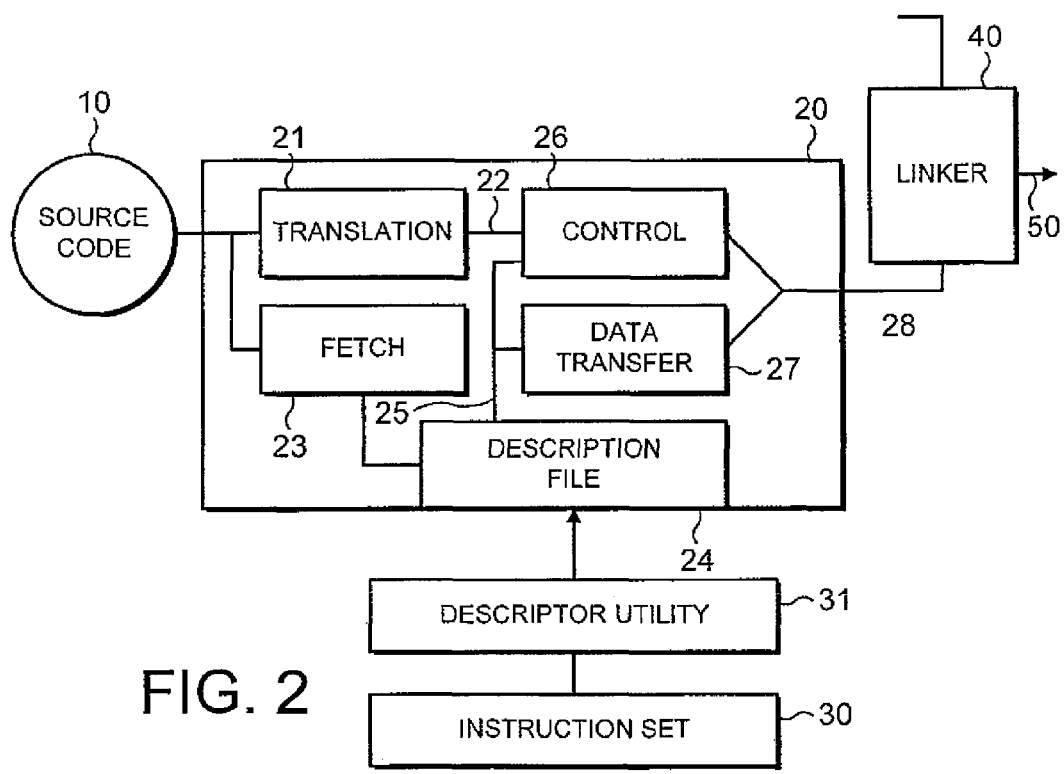
FIG. 2 is a block diagram showing an exemplary preferred embodiment to the invention.

The arrangement shown in FIG. 2 has some similarities to that of FIG. 1 in that it shows a source code module 10 which is applied to an assembler 20 which outputs object code to a linker 40, which receives inputs of other object code modules, shared libraries and the like to provide an executable program 50.

The assembler 20 consists of a translation device 21 which responds directly to the source code 10 to provide an encoded output 22 which represents a direct transliteration of the source code. The source code is also input to a fetch unit 23 whose function is to address a descriptor file 24 with information derived from the source code currently being translated to provide output information 25 representative of constraints due to the instruction set architecture. The output information 25 is applied to a control device 26 which operates on the translated information 22 to constrain that information to conform with the requirements of the instruction set. The output information 25 is also applied to a data transfer device 27 whose output is combined with the constrained translated information to provide an assembler output 28.

Generally speaking, the data conforming to the source code is provided from the control device 26 whereas the data transfer device 27 provides the information directly to the linker 40. This enables the linker to perform operations on the data, again determined by the instruction set. If for example the instruction requires scaling to be effected, this can be achieved by providing the relevant scaling factor via the data transfer device to the linker. This happens for example when the scaling is to be applied to an external symbol—i.e. a symbol whose value is known only at link time.

In this embodiment, the descriptor file is derived manually from manipulation and inspection of the instruction set 30 but in a preferred embodiment, a utility program 31 is used to access instruction set architecture data 30 to provide the descriptor file 24.

FIGS. 3 and 5 show two exemplary instructions, each of which are in fact 32 bits long, although fewer than this number of bits is shown. In FIG. 3 the instruction includes an opcode A which requires two source registers RS1 and RS2 as well as a destination register (not shown).

In this instruction, the first source register has a starting bit position of zero and a finishing bit position of 5 and the second source register has a starting bit position of 14 and a finishing bit position of 19. The bits between bits 5 and 14 are either empty or serve a function such as indicating an instruction format.

Referring to FIG. 5 a second instruction has an opcode of B and in this case requires immediate data IMM1 starting at bit position 0 and running to bit position 7, and a destination register whose numeric identity is specified by bits 14-18.

It will be seen from this example that a substantial part of the output of the assembler requires alignment with the instruction set both from the point of view of the starting position of a particular bit field and the number of bits available for that bit field.

The instruction set database comprises information about the bit fields of each instruction. For instance it may be decided to scale (divide) by two on an address operand in order to use a smaller bit field. This information (in general the encoding function) is used by the assembler and is passed to the linker for use with external symbols.

By further providing the decoding function (e.g. multiply by two, in the example above,) a user's source code can be checked for the error of specifying an unencodeable value, such as an odd address in this example, or a register whose number is out of range.

The present invention provides information descriptive of the instruction set in the descriptor file 24 shown in FIG. 2 a part of which is diagrammatically shown in FIGS. 4 and 6. In each of these Figures, the top line represents an identifier for the operand of concern, in FIG. 4 "1A" represents RS1 and "2A" represents RS2 whereas in FIG. 6 "IB" represents IMM1 and "DB" represents RD1, each of these being associated with the relevant bit field. Line 2 in each of the Figures shows the starting bit position for the associated operand, and the third line shows the bit length of the operand. The fourth line shows the end bit of each operand.

For each instruction the syntax, eg the mnemonic and its equivalent is derived and stored and for each bit field in the instruction the type of information of each bit field is derived and stored. For instance "12" for a particular opcode, all φ's for a reserved field, values 0-15 for a register, address/4 for a symbolic value.

The assembler then accesses the stored information to enable it to accept assembly language instructions, from for example source code modules, and encode those instructions to provide a translated output in machine language.

As an example, for a microprocessor having a set of 16 registers, it is decided to define an instruction for loading a value from external memory to a specified one of the set of registers. Such an instruction is given the mnemonic MOV and the particular register is defined as Rn, with n=0-15. It is further decided that bits 8-12 will contain the pattern 10110 for this instruction in a 2 byte instruction length. The address is to be encoded in bits 1-7 and the register number is specified in bits 13-16. This data is stored as the descriptor file. When supplied with user source code of the form:

MOV fred, R12 ("fred" being an external symbol) the assembler accesses the descriptor file to enable it to transliterate the assembly language into machine language, filling in the opcode and register. Moreover the necessary data are supplied from the descriptor file to enable the linker how to patch in "fred".

What we claim is:

1. A method of operating a microprocessor, the method comprising:

executing an assembler program that accepts assembly language source code and transforms the assembly language source code into machine language source code for a target microprocessor, wherein executing the assembler program causes the microprocessor to perform steps of:

accessing the assembly language source code and a descriptor file;

obtaining from the descriptor file information descriptive of an instruction set of the target microprocessor;

using the assembly language source code and the information obtained from the descriptor file to translate the assembly language source code into the machine language source code that conforms to an architecture of the instruction set; and providing as an output the machine language source code conforming to the information, wherein a portion of the assembler program that translates the assembly language source code into the machine language source code is generated before accessing the descriptor file;

wherein the descriptor file comprises syntax information for each instruction in the instruction set of the target microprocessor, and wherein executing the assembler program causes the microprocessor to perform a step of translating the assembly language source code into the machine language source code by transliterating each assembly language instruction from the assembly language source code based on the syntax information.

2. The method of claim 1, wherein the information obtained from the descriptor file comprises a starting position of at least one bit field and a number of bits available for the at least one bit field for at least one instruction in the instruction set.

3. The method of claim 2, wherein the information obtained from the descriptor file further comprises a scaling factor to be applied to at least one of the starting position of the at least one bit field and the number of bits available for the at least one bit field.

4. The method of claim 3, wherein executing the assembler program further causes the microprocessor to perform a step of checking for at least one error in the assembly language source code, based on the scaling factor.

5. The method of claim 3, wherein executing the assembler program further causes the microprocessor to perform a step of outputting the scaling factor to a linker to enable the linker to perform operations on the machine language source code conforming to the information.

6. The method of claim 5, wherein the linker applies the scaling factor to at least one external symbol.

7. The method of claim 1, wherein executing the assembler program further causes the microprocessor to perform a step of addressing the descriptor file with second information derived from the assembly language source code to generate output information representative of constraints due to the architecture of the instruction set that is described in the descriptor file.

8. The method of claim 7, wherein executing the assembler program further causes the microprocessor to perform a step of outputting the output information to a linker to enable the linker to perform operations on the machine language source code conforming to the output information.

9. The method of claim 8, wherein the data comprises a scaling factor to be applied to a starting position of at least one bit field and a number of bits available for the at least one bit field for at least one instruction in the instruction set.

10. A microprocessor executing an assembler program that accepts assembly language source code and transforms the assembly language source code into machine language source code for a target microprocessor, wherein, by executing the assembler program, the microprocessor:
   accesses the assembly language source code and a descriptor file;
   obtains from the descriptor file information descriptive of an instruction set of the target microprocessor;
   uses the assembly language source code and the information obtained from the descriptor file to translate the assembly language source code into the machine language source code that conforms to an architecture of the instruction set; and
   provides as an output the machine language source code conforming to the information, wherein a portion of the assembler program that translates the assembly language source code into the machine language source code is generated before accessing the descriptor file;
   wherein the descriptor file comprises syntax information from each instruction in the instruction set of the target microprocessor, and wherein the microprocessor translates the assembly language source code into the machine language source code by transliterating each assembly language instruction from the assembly language source code based on the syntax information.

11. The microprocessor of claim 10, wherein the information obtained from the descriptor file comprises a starting position of at least one bit field and a number of bits available for the at least one bit field for at least one instruction in the instruction set.

12. The microprocessor of claim 11, wherein the information obtained from the descriptor file further comprises a scaling factor to be applied to at least one of the starting position of the at least one bit field and the number of bits available for the at least one bit field.

13. The microprocessor of claim 12, wherein the microprocessor further checks for at least one error in the assembly language source code, based on the scaling factor.

14. The microprocessor of claim 12, wherein the microprocessor outputs the scaling factor to a linker to enable the linker to perform operations on the machine language source code conforming to the information.

15. The microprocessor of claim 14, wherein the linker applies the scaling factor to at least one external symbol.

16. The microprocessor of claim 10, wherein the microprocessor addresses the descriptor file with second information derived from the assembly language source code to generate output information representative of constraints due to the architecture of the instruction set that is described in the descriptor file.

17. The microprocessor of claim 16, wherein the microprocessor outputs the output information to a linker to enable the linker to perform operations on the machine language source code conforming to the output information.

18. The microprocessor of claim 17, wherein the data comprises a scaling factor to be applied to a starting position of at least one bit field and a number of bits available for the at least one bit field for at least one instruction in the instruction set.

19. At least one computer-readable storage memory storing an assembler program that, when executed by a microprocessor, performs a method of accepting assembly language source code and transforming the assembly language source code into machine language source code for a target microprocessor, the method comprising acts of:
   accessing the assembly language source code and a descriptor file;
   obtaining from the descriptor file information descriptive of an instruction set of the target microprocessor;
   using the assembly language source code and the information obtained from the descriptor file to translate the assembly language source code into the machine language source code that conforms to an architecture of the instruction set; and
   providing as an output the machine language source code conforming to the information, wherein a portion of the assembler program that translates the assembly language source code into the machine language source code is generated before accessing the descriptor file;
   wherein the descriptor file comprises syntax information for each instruction in the instruction set of the target microprocessor, and wherein the method further comprises an act of translating the assembly language source code into the machine language source code by transliterating each assembly language instruction from the assembly language source code based on the syntax information.

20. The at least one computer-readable storage memory of claim 19, wherein the information obtained from the descriptor file comprises a starting position of at least one bit field and a number of bits available for the at least one bit field for at least one instruction in the instruction set.

21. The at least one computer-readable storage memory of claim 20, wherein the information obtained from the descriptor file further comprises a scaling factor to be applied to at least one of the starting position of the at least one bit field and the number of bits available for the at least one bit field.

22. The at least one computer-readable storage memory of claim 21, wherein the method further comprises an act of checking for at least one error in the assembly language source code, based on the scaling factor.

23. The at least one computer-readable storage memory of claim 21, wherein the method further comprises an act of outputting the scaling factor to a linker to enable the linker to perform operations on the machine language source code conforming to the information.

24. The at least one computer-readable storage memory of claim 23, wherein the linker applies the scaling factor to at least one external symbol.

25. The at least one computer-readable storage memory of claim 19, wherein the method further comprises an act of addressing the descriptor file with second information derived from the assembly language source code to generate output information representative of constrains constraints due to the architecture of the instruction set that is described in the descriptor file.

26. The at least one computer-readable storage memory of claim 25, wherein the method further comprises an act of outputting the output information to a linker to enable the linker to perform operations on the machine language source code conforming to the output information.

27. The at least one computer-readable storage memory of claim 26, wherein the data comprises a scaling factor to be applied to a starting position of at least one bit field and a number of bits available for the at least one bit field for at least one instruction in the instruction set.

* * * * *

UNITED STATES PATENT AND TRADEMARK OFFICE
CERTIFICATE OF CORRECTION

PATENT NO.       : 8,464,235 B2
APPLICATION NO.  : 12/686987
DATED            : June 11, 2013
INVENTOR(S)      : Richard Shann et al.

It is certified that error appears in the above-identified patent and that said Letters Patent is hereby corrected as shown below:

In the Specification

Col. 2, line 48, should read:
--providing assembly language instructions for said target--

In the Claims

Col. 9, line 1, claim 25, should read:
--output information representative of constraints--

Signed and Sealed this
Sixteenth Day of July, 2013

Teresa Stanek Rea
*Acting Director of the United States Patent and Trademark Office*